United States Patent [19]

Houldsworth

[11] 4,388,631

[45] Jun. 14, 1983

[54] CHART RECORDER

[75] Inventor: John Houldsworth, Washington, Nr. Pulborough, England

[73] Assignee: Chessell Limited, Worthing, England

[21] Appl. No.: 243,055

[22] Filed: Mar. 12, 1981

[51] Int. Cl.³ .................. G01D 9/34; G01D 15/24
[52] U.S. Cl. ................................ 346/141; 346/61
[58] Field of Search ............... 346/139 R, 141, 46, 346/61

[56] References Cited

U.S. PATENT DOCUMENTS 3,243,821 3/1966 Bogs et al. .................. 346/46 X
3,543,279 11/1970 Rempel et al. ................ 346/141
3,576,582 4/1971 Smith ........................ 346/61 X
4,170,780 10/1979 Caron et al. ................. 346/61 X
4,199,765 4/1980 Freude ........................ 346/61

Primary Examiner—Donald A. Griffin
Attorney, Agent, or Firm—Irving M. Weiner; Pamela S. Burt; John L. Shortley

[57] ABSTRACT

A chart recorder is described in which the writing head is rotatable by a motor to position any one of several writing tips over the paper. The motor is mounted on the same carriage as the writing head for movement relative to the paper.

11 Claims, 2 Drawing Figures

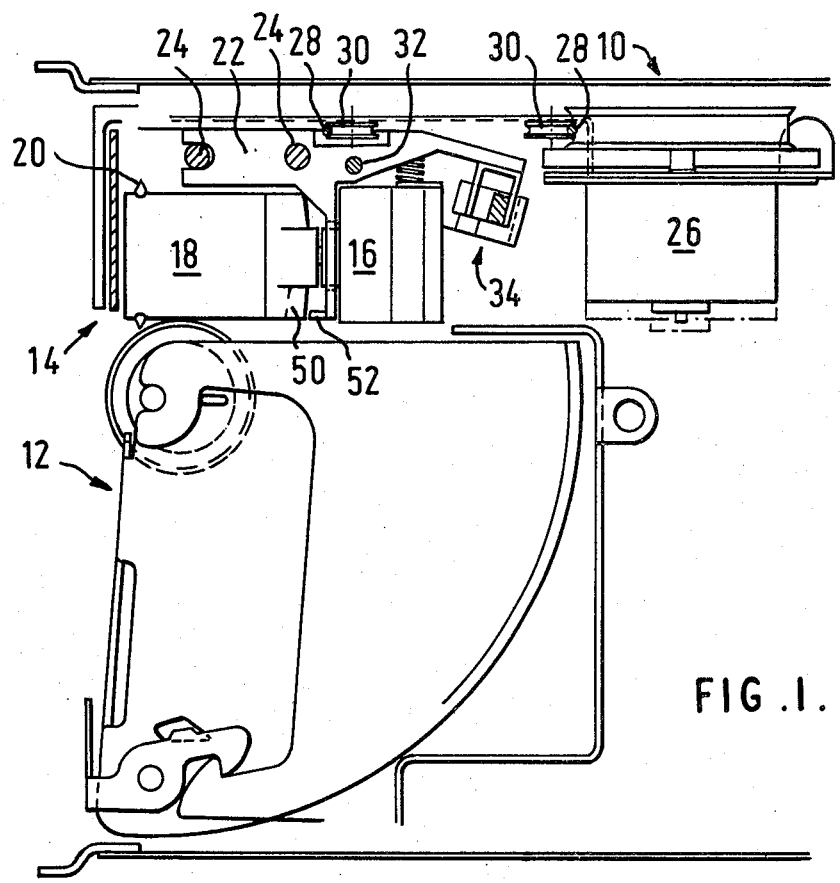
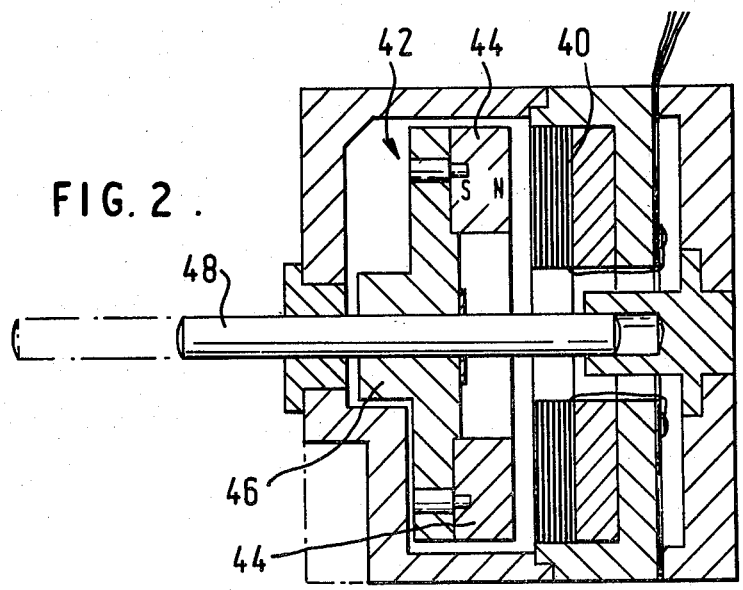

CHART RECORDER

The present invention relates to a chart recorder.

As is well known, a chart recorder is a device which provides a permanent trace on a recording medium showing the variations of a measured parameter with time. The recording medium, for example paper, is moved past a writing head which itself moves transversely with respect to the paper in dependence upon the measured parameter.

Chart recorders are known which plot a plurality of parameters simultaneously using different heads which are staggered from one another in a suitable manner.

The present invention seeks to provide a simplified chart recorder for recording traces of a plurality of parameters.

In accordance with the present invention, there is provided a chart recorder for producing a record of a plurality of parameters, having a writing head movable transversely with respect to the direction of movement of a recording medium, wherein the writing head includes a rotatable holder supporting a plurality of pens each including an ink reservoir and a writing tip circumferentially spaced about its periphery and a motor movable with the holder for rotating the holder to select a writing tip in dependence upon the parameter being recorded.

The traces are in the form of interrupted lines each line segment being produced by actuating the head to bring the writing tip into contact with the recording medium when the transverse position of the writing head with respect to the recording medium corresponds to the value of the parameter being recorded.

Conveniently, the pens may be felt tipped pens of different colours located in the holder. The term "felt-tipped" is being used in its looser sense to include tips of other than felt, for example, fibre tips and tips of sintered plastics material.

Conveniently, the motor may have a plurality of coils circumferentially distributed about the axis of the holder and a permanent magnet rotor having diammetrically opposed north and south poles facing the ends of the coils.

Advantageously, the axes of the coils are parallel to the axis of the holder and the north and south poles of the rotor are formed by arcuate coplanar pieces.

To provide still more accurate angular positioning of the holder, it is advantageous for the holder to include recesses arranged to co-operate with a detent to ensure that the holder can only adopt predetermined angular positions. If desired the detent and recess may act as a pawl and ratchet to ensure rotation of the holder is only one direction.

The pole faces may each conveniently extend over an angle sufficient to align each pole face with a plurality of coils so as to increase the torque applied to the rotor.

In order to actuate the writing head to produce a marking on the recording medium, the motor may conveniently be pivoted on a carriage transversely slidable with respect to the medium and an electromagnet may be provided to pivot the motor with respect to the carriage to cause the selected writing point to mark the recording medium.

The position of the writing head with respect to the recording medium may be determined by means of a closed feedback loop comparing the actual position of the writing head as determined by an analogue sensor with the signal to be recorded. Alternatively, a digitally operating open loop may serve to position the writing head in dependence upon the magnitude of the parameter to be recorded.

The parameters may be charted on the recording medium in a predetermined order but preferably the order is selected in each line in dependence upon the magnitude of the parameters in that line whereby to minimise the movement of the writing head relative to the medium.

The invention will now be described further, by way of example, with reference to the accompanying drawings, in which:

FIG. 1 is a schematic representation of a section through a chart recorder in accordance with the invention, and FIG. 2 is a section through a motor incorporated in the chart recorder of FIG. 1.

The chart recorder in FIG. 1 comprises a housing 10 which contains recording medium support and feeding means including a paper feed mechanism generally designated 12 in which paper is guided steadily past a writing head 14 which is movable transversely with respect to the paper. The writing head 14 includes a motor 16 which serves to drive a pen-holder 18 carrying writing tip means in the form of six felt tipped pens, the tips of which are designated 20. The tips 20 are circumferentially spaced about the periphery of the holder 18. The motor 16 and the pen holder 18 are supported by a carriage 22 which is guided for transverse movement with respect to the paper by mounting and moving means including means of a pair of rails 24. The displacement of the carriage 22 is effected by means of a motor 26 connected to the carriage by means of a cord 28 guided over pulleys 30.

The motor 16 is pivotable relative to the carriage 22 about an axis 32, pivoting being effected by actuation of an electro magnet 34. When acuated, the electro-magnet 34 serves to pivot the motor 16 and the pen holder 18 counter-clockwise as viewed in FIG. 1 to cause the relevant writing tip 20 to come in contact with the paper. An electrical measuring unit, not shown, is also incorporated in the housing 10 and determines when the transverse position of the writing head 14 corresponds with the magnitude of a parameter to be recorded to cause actuation of the electro-magnet 34. The electrical unit may comprise an amplifier followed by a comparator for comparing the actual position of the writing head with the position corresponding to the magnitude of the parameter to be recorded and serving to apply an error signal to the motor 26. Alternatively, the control of the position of the writing head may be effected by means of an open loop wherein the position of the motor 26 may, for example, be digitally controlled in dependence upon the magnitude of the parameter to be recorded.

As previously stated, the pen holder 18 carries six circumferentially spaced pens each of a different colour and each intended to represent a different parameter. The motor 16 serves to position the appropriate pen corresponding to the next parameter to be recorded. The motor 16 is a coil-excited axial field motor, the coils being stationary. The motor 16 is shown in more detail in FIG. 2 and comprises six separate electromagnets or coils 40 the axes of which are parallel to the axis of rotation of the holder 18. The coils 40 are positioned on an annular backing plate (not referenced) within the central part of the three-part casing of the motor 16, the leads being taken through the center of the backing plate and out of the casing by a thin disc between the central and rear part of the casing. The rotor 42 comprises two magnets 44 in the form of semi-circular segments mounted on a circular plate 46 connected to the output shaft 48 of the motor providing diametrically opposed north and south poles. Three of the coils 40 are supplied with a current of a first polarity whilst the remaining three are fed with a current of the opposite polarity, i.e. the coils 40 can be energized in two groups. This results in the rotation of the rotor 42 to align the permanent magnets 44 with the oppositely poled coils 40. By energising three electromagnets of any one polarity at a time, a substantial torque may be developed by the motor.

To ensure precise positioning of the pen holder 18, the base of the pen holder includes six recesses 50 of which only one is shown in FIG. 1 in dotted lines. A detent 52 projects from the carriage 22 and engages one of the recesses 50 when the holder 18 is rotated so as to provide precise positioning of the felt tip 20. If desired the detent 52 may be shaped as a pawl and the recesses 50 may form a ratchet whereby to permit rotation in only one direction.

The order of marking of the different colours on the paper may be fixed but this could result in several transverses of paper by the writing head during each scan line. To avoid unnecessary movement of the writing head, a memory circuit is incorporated in the chart recorder (not illustrated in the drawings) in which are stored the values to be printed in the next line and the colours are selected in order of increasing displacement along the recording medium.

What is claimed is:

1. A chart recorder for producing a record of a plurality of 2 parameters, the recorder comprising;
    means for supporting a recording medium and for feeding the same forward;
    a writing head; means mounting the writing head for movement transversely of the recording medium, and means for moving the writing head transversely of the recording medium;
    a rotatable holder forming part of the writing head;
    a plurality of writing tip means supported by the 11 rotatable holder and circumferentially spaced about the 12 periphery of the rotatable holder; and
    an axial field motor movable transversely with the rotatable holder, for rotating the rotatable holder to 15 select a writing tip means in dependence upon parameter being recorded.

2. A chart recorder according to claim 1, wherein the motor has a plurality of coils circumferentially distributed about the axis of the motor and a permanent magnet rotor having diammetrically opposed north and south poles facing the end of the coils.

3. A chart recorder according to claim 2, wherein the coils are positioned on an annular backing plate within the casing of the motor.

4. A chart recorder according to claim 2 or 3, wherein the north and south poles of the rotor are formed by arcuate coplanar pieces.

5. A chart recorder according to claim 2 or 3, wherein the rotor comprises two semi-circular permanent magnets, and wherein there is an even number of said coils and electrical connection means connecting said coils whereby they can be energized in two different groups.

6. A chart recorder according to claim 1, wherein the means mounting and moving the writing head comprises a carriage transversely slidable with respect to the recording medium, the motor being pivoted to the carriage and an electromagnet being provided to pivot the motor with respect to the carriage to cause the selected writing point to mark the recording medium.

7. A chart recorder according to claim 6, wherein at least one recess and at least one detent are provided on the rotatable holder and the carriage to ensure that the rotatable holder can only adopt predetermined angular positions during writing.

8. A chart recorder according to claim 7, wherein the detent and the said at least one recess constitute a pawl and ratchet mechanism to permit rotation of the rotatable holder in only one direction.

9. A chart recorder according to claim 1, further comprising an analogue sensor for producing a signal representative of the transverse position of the writing head with respect to the recording medium, and a comparator for comparing the output signal of the sensor with the magnitude of a signal to be recorded and actuating the writing head when the two compared signals are equal to one another.

10. A chart recorder as claimed in claim 1, comprising a digital open control loop for positioning the writing head in dependence upon the magnitude of a parameter to be recorded.

11. A chart recorder as claimed in claim 1, further comprising a memory for storing all the signals to be recorded in a given line and means for selecting the writing tip means in the order of increasing magnitudes of the values stored in the said memory so as to minimize the movement of the writing head relative to the recording medium.

* * * * *